C. W. LEVALLEY.
HARVESTER.

No. 193,122. Patented July 17, 1877.

Attest:
Alexander Mahow
John G. Center

Inventor:
C. W. Levalley
by A. M. Smith
Atty

UNITED STATES PATENT OFFICE.

CHRISTOPHER W. LEVALLEY, OF ST. PAUL, MINNESOTA.

IMPROVEMENT IN HARVESTERS.

Specification forming part of Letters Patent No. 193,122, dated July 17, 1877; application filed May 9, 1877.

*To all whom it may concern:*

Be it known that I, CHRISTOPHER W. LE-VALLEY, of St. Paul, county of Ramsey, State of Minnesota, have invented certain new and useful Improvements in Harvesters, of which the following is a full, clear, and exact description, reference being had to the accompanying drawings, making part of this specification, in which—

Figure 1:
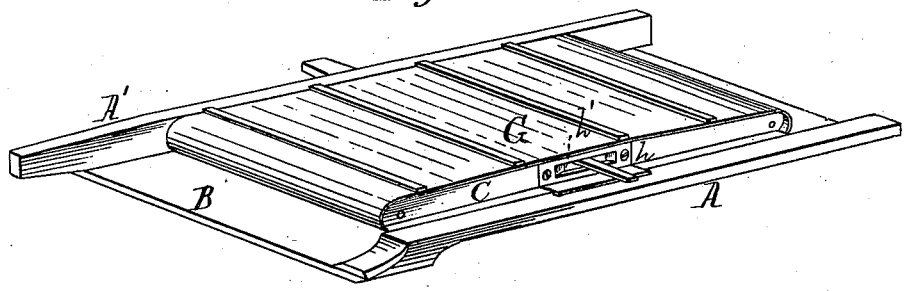
Figure 2:
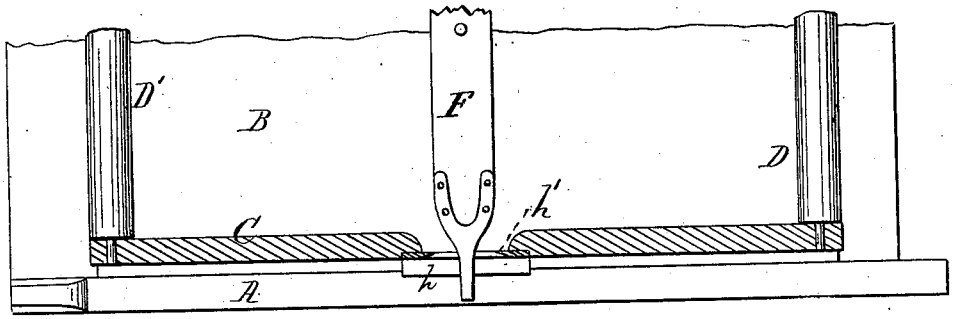
Figure 3:
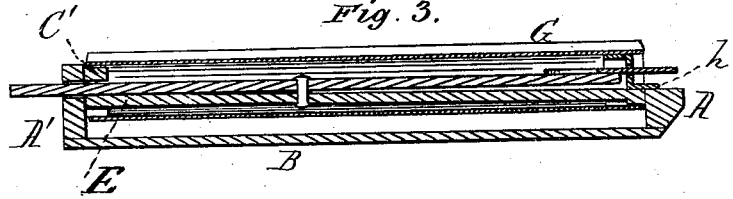

Figure 1 is a perspective view of a harvester-platform, showing my improvements. Fig. 2 is a plan view of the same, partly in section, with the canvas carrier removed; and Fig. 3 is a vertical section of the same, taken in line with the sickle-lever.

Similar letters of reference denote corresponding parts in all the figures.

My invention relates to that class of harvesting-machines employing a canvas apron platform or carrier, and in which the sickle-bar is vibrated by means of a lever passing through the apron; and consists in a novel means for protecting the apron-carrier from clogging matter in the shape of short straw, heads, grass, and other obstructing material, such as would be liable to pass through the lever-slot in the forward apron-bar, and so get into the apron and interfere with its action.

In the accompanying drawings, A represents the forward platform-bar, which may either constitute the finger-bar, or be made separate therefrom, as preferred, and A' is the rear platform-bar, these bars A A', being connected by the flooring B and by end timbers, in any usual or preferred way.

C is the forward canvas-bar, secured to the rear face of bar A, with its lower face raised above the flooring, to permit the apron to inclose and pass around the bar, as shown, a similar bar, C', being secured to and projecting forward from the rear platform-bar A'. The apron-rollers D D' have their bearings in these bars, and midway between these rollers is a bar, E, extending between the platform-bars A A', from front to rear, and forming a support for the sickle-lever F, pivoted thereon at or near midway of its length, as shown in Fig. 3. G is the apron or carrier, provided with slats or teeth under any usual or preferred arrangement, said apron passing around the canvas-bars C C, rollers D D' and bar E, and sickle-lever F, as shown. The forward upper edge of the forward canvas-bar C is cut away in the form of a rabbet, in such manner that the apron shall overhang its upper forward face, as shown in Figs. 1 and 3, and at or near midway of its length is cut away or provided with a horizontal slot, to permit the passage of the sickle-lever through it, and the necessary vibration of the same. The space or slot thus formed is covered by a metal plate, *h*, also slotted, to permit the passage through and the vibration of the sickle-lever.

The plate *h* may be made in the angular form shown, or in any suitable form adapting it to be secured to the canvas-bar C or platform-bar A, either or both, and, by preference, is let into the forward face of bar C, so as to be flush on its forward vertical face therewith; but this is not essential. The slot in the plate is somewhat shorter than that through the bar C, causing its vertical end walls to overhang the vertical walls of said slot in said bar C; and these end walls of the slot in plate *h* are beveled and brought to a cutting-edge, as shown at *h'*, terminating in close proximity with the sides of the sickle-lever when at the end of its throw on either side.

The sickle-lever is provided, on its forward end, with a metallic point or extension, which passes through the slots in bar C and plate *h*, and is connected with the sickle-bar in any usual or preferred manner.

By this construction and arrangement above described, it will be seen that short straw or other clogging matter that may get caught in the slot in the plate *h* will be carried, by the vibration of the sickle-lever, against one of the vertical walls of said slot, and there cut between said wall and lever, and prevented from entering sufficiently far to be caught upon and dragged in by the moving apron, the movement of the lever and the outward bevel of the end walls of the slot tending continually to thrust all such clogging matter outward, and the forward edge of the apron, overhanging, as it does, the forward face of the bar C, as explained, and being in close proximity to the horizontal surface on which such obstructing matter rests, serves to act upon the latter, and to move it inward until it clears the apron and is discharged at its inner end.

Having now described my invention, what I claim as new, and desire to secure by Letters Patent, is—

1. The slotted plate $h$, or its equivalent, through which the sickle-lever passes, provided at the ends of the slot with cutting-edges, substantially as described.

2. The forward canvas-bar C, provided with the rabbet and with the sickle-lever slot, having the cutting-walls, as explained, in combination with the carrier-apron, arranged to overhang its upper forward edge, as described.

CHRISTOPHER W. LEVALLEY.

Witnesses:
    ED. L. SUSHOLTS,
    R. C. MOORE.